United States Patent
Traitler et al.

(10) Patent No.: US 8,960,075 B2
(45) Date of Patent: Feb. 24, 2015

(54) DISPENSING SYSTEM AND METHOD

(76) Inventors: Helmut Traitler, Pasadena, CA (US); Nikolaus Hafermaas, Los Angeles, CA (US); Rory Craig, La Canada, CA (US)

(*) Notice: Subject to any disclaimer, the term of this patent is extended or adjusted under 35 U.S.C. 154(b) by 614 days.

(21) Appl. No.: 13/226,442

(22) Filed: Sep. 6, 2011

(65) Prior Publication Data
US 2012/0055342 A1  Mar. 8, 2012

Related U.S. Application Data

(60) Provisional application No. 61/380,698, filed on Sep. 7, 2010.

(51) Int. Cl.
*A47J 31/44* (2006.01)
*A47J 31/36* (2006.01)
*A47J 31/46* (2006.01)
*A47J 31/52* (2006.01)

(52) U.S. Cl.
CPC .......... *A47J 31/369* (2013.01); *A47J 31/4492* (2013.01); *A47J 31/46* (2013.01); *A47J 31/52* (2013.01)
USPC ........................................................ 99/279

(58) Field of Classification Search
CPC ..... A47J 31/369; A47J 31/4492; A47J 31/46; A47J 31/3676; B65B 29/02; B65B 29/04; B65D 85/804; B65D 85/8046
USPC ........................................... 99/279; 426/433
See application file for complete search history.

(56) References Cited

U.S. PATENT DOCUMENTS

| | | | |
|---|---|---|---|
| 3,500,742 A * | 3/1970 | Tanguy et al. | 99/326 |
| 6,117,471 A * | 9/2000 | King | 426/433 |
| 7,398,726 B2 * | 7/2008 | Streeter et al. | 99/305 |
| 7,523,695 B2 * | 4/2009 | Streeter et al. | 99/305 |
| 8,459,179 B2 * | 6/2013 | Ozanne et al. | 99/295 |
| 2002/0048621 A1* | 4/2002 | Boyd et al. | 426/77 |
| 2005/0150391 A1* | 7/2005 | Schifferle | 99/295 |
| 2006/0196363 A1* | 9/2006 | Rahn | 99/279 |
| 2008/0302251 A1* | 12/2008 | Rijskamp et al. | 99/295 |
| 2009/0219140 A1* | 9/2009 | Guard et al. | 340/10.1 |

* cited by examiner

*Primary Examiner* — Dana Ross
*Assistant Examiner* — Renee L Miller

(57) ABSTRACT

A system and method for dispensing a final fluid product using optimal parameters are disclosed. The dispensing system includes a pumping system and a capsule holder operatively coupled to the pumping system, the capsule holder configured to receive a capsule containing a product to be dissolved, the capsule holder further configured to receive a fluid through the capsule from the pumping system. The capsule holder includes one or more encoding recognition systems configured to interact with encoding means of the capsule, and the encoding recognition systems determine parameters based on the encoding means. The parameters control the pumping system and are used for dispensing of the fluid through the capsule holder and through the capsule to produce the final fluid product by dissolving the product to be dissolved using the parameters. The dispensing system may further use user information to adjust the parameters.

16 Claims, 10 Drawing Sheets

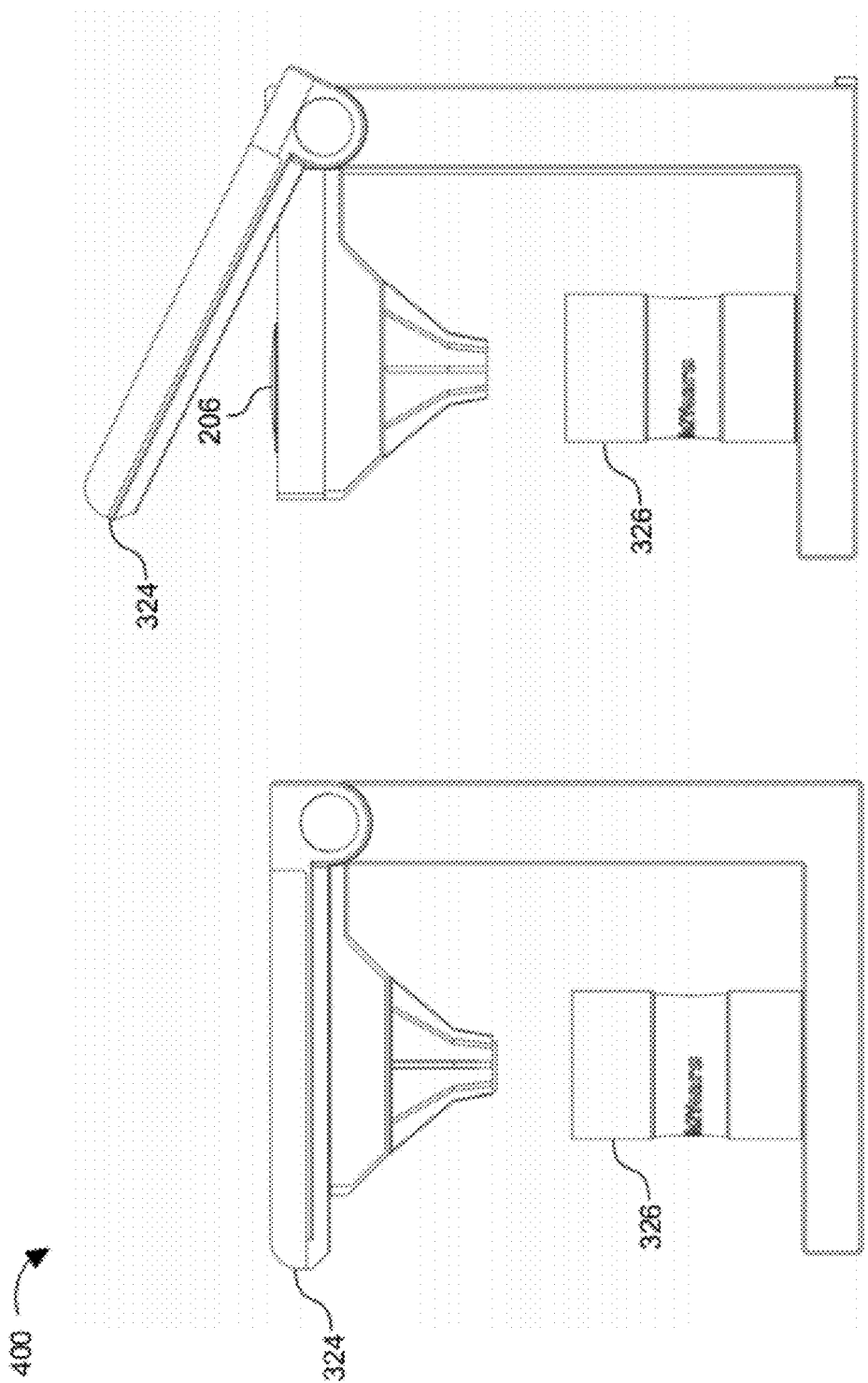

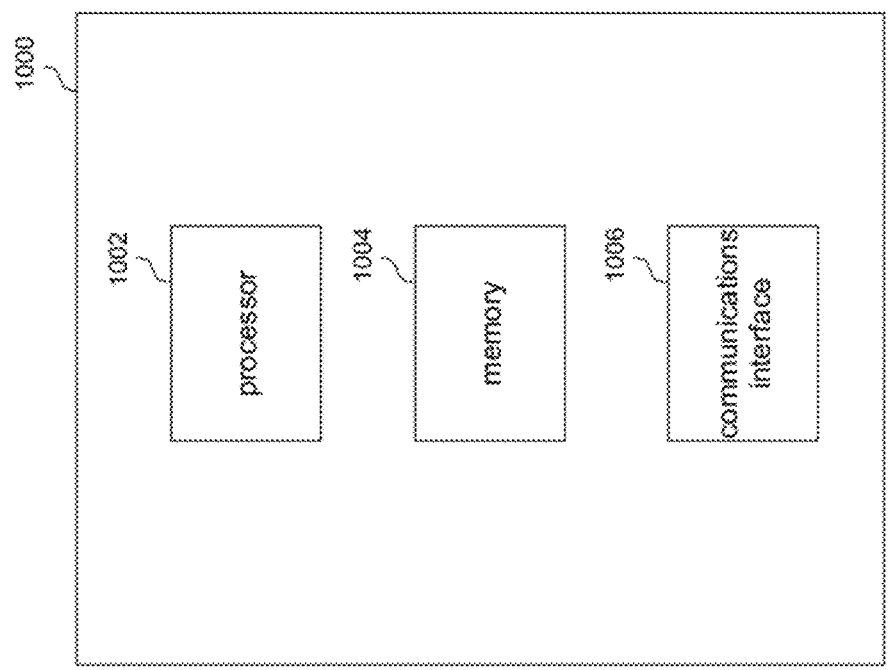

DISPENSING SYSTEM AND METHOD

CROSS REFERENCE TO RELATED APPLICATION

This application is entitled to the benefit of U.S. Provisional Patent Application Ser. No. 61/380,698, filed on Sep. 7, 2010, which is incorporated herein by reference.

BACKGROUND

Health and Wellness beverages are offering an excellent source of healthy drinks (e.g., beverages, medical foods, therapeutic drinks) that can address numerous deficiencies that are becoming more obvious as the population is maturing and/or has special needs. Beverages that are scientifically formulated could meet specific needs such a person's need for protein, amino-acids, micronutrients, fat, fatty acids, carbohydrate, vitamins, minerals, lactose-free products, gluten-free products, and energy. The beverages can be an excellent source of nutrition and medical products. The beverages must be produced under strict control of optimal temperature and liquid volume to insure the highest quality and taste of the health and wellness beverages dispensed. However, to date most health and wellness beverages are suffering from unappealing taste, and their preparation is not straightforward and quite cumbersome especially for the mature population.

Dispensing machines dispense cold drinks such as soda, water, juices or hot drinks, such as coffee, tea or hot chocolate. Cold drink dispensers dispense prepackaged drinks such as cans or bottles. Some cold drink dispensers dispense cold beverages made in a machine by combining cold water with flavored fluid syrup. The syrup is contained in a container, and either mixed with the water in a mixing bowl or directly in a drinking cup.

Hot drink dispensers often have ingredients in powder form. The powders are held in big or small containers (capsules or pods), which have an outlet for dispensing the powder into a mixing bowl or directly into a drinking cup. For some beverages, the powder is combined with hot water to produce the final beverage. Other beverages rely on solvent extraction wherein agents are extracted by the heated solvent in solution.

Sports drinks, nutritional drinks, and fluid meal replacement drinks are used by athletes, diet and health conscious individuals, and those with limited time for meals. These drinks come in many different varieties. Each variety often has different ingredients, thus creating differences in their consistency, density, and thermal properties requiring different care and different recipes.

SUMMARY OF THE INVENTION

A system and method for dispensing a final fluid product using optimal parameters are disclosed. The dispensing system includes a pumping system and a capsule holder operatively coupled to the pumping system, the capsule holder configured to receive a capsule containing a product to be dissolved, the capsule holder further configured to receive a fluid through the capsule from the pumping system. The capsule holder includes one or more encoding recognition systems configured to interact with encoding means of the capsule, and the encoding recognition systems determine parameters based on the encoding means. The parameters control the pumping system and are used for dispensing of the fluid through the capsule holder and through the capsule to produce the final fluid product by dissolving the product to be dissolved using the parameters. The dispensing system may further use user information to adjust the parameters.

A system in accordance with an embodiment of the invention includes a pumping system and a capsule holder operatively coupled to the pumping system, the capsule holder configured to receive a capsule containing a product to be dissolved, the capsule holder further configured to receive a fluid through the capsule from the pumping system. The capsule holder may include one or more transducers configured to interact with one or more tabs of the capsule, whereby the transducers determine parameters based on the one or more tabs. The parameters may be used for dispensing of the fluid through the capsule holder and through the capsule to produce the final fluid product by dissolving the product to be dissolved using the parameters, whereby the parameters control the pumping system. The parameters may include a temperature of the fluid inside the capsule holder, a pressure of the fluid inside the capsule holder, a volume of the fluid passing through the capsule holder to produce the final fluid product.

A capsule in accordance with an embodiment of the invention includes a recipient including a product to be dissolved and one or more tabs, whereby the length of the tabs is configured to encode at least one of one or more parameters used to produce a final fluid product from the product to be dissolved.

A method in accordance with an embodiment of the invention includes receiving a capsule containing a product, identifying encoding means of the capsule, the encoding means determining parameters to be used for dispensing the product, and using the parameters to control a pumping system used for dispensing said product.

Other aspects and advantages of the present invention will become apparent from the following detailed description, taken in conjunction with the accompanying drawings, illustrated by way of example of the principles of the invention.

BRIEF DESCRIPTION OF THE DRAWINGS

FIGS. 4A and 4B depict schematic diagrams of a design of a dispensing system in accordance with an embodiment of the invention.

FIG. 10 depicts a computing system that includes a processor, a memory, and a communications interface.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
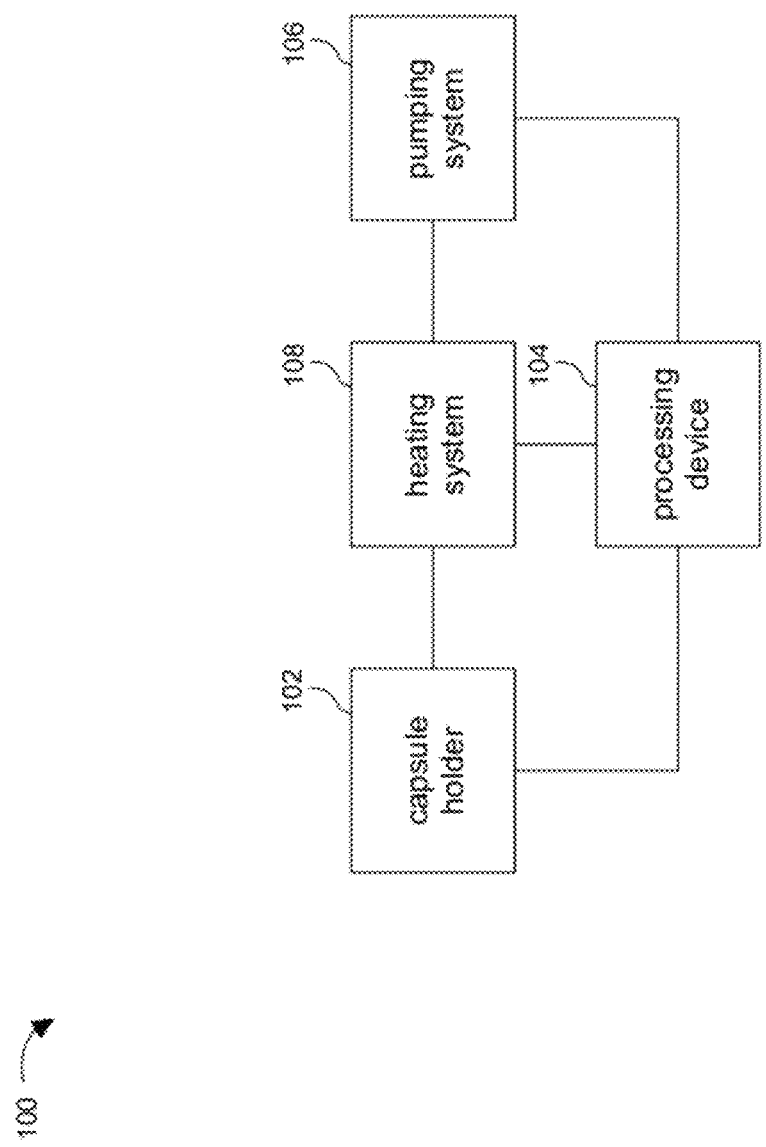
FIG. 1 depicts a schematic block diagram of a system for dispensing a final product in accordance with an embodiment of the invention.

FIG. 1 depicts a schematic block diagram of a dispensing system 100 for dispensing a final product in accordance with an embodiment of the invention. In the example of FIG. 1, the dispensing system includes a capsule holder 102, a processing device 104, a storage module 106, a pumping system 106, and a heating system 108. In the example of FIG. 1, the capsule holder is configured to receive a capsule containing a product. Although the heating system is shown in FIG. 1, the heating system may be omitted if the dispensed final product is, for example, a cold liquid. The product contained in the capsule is typically in the form of a powder, gel or liquid (e.g., a concentrate) and the product is dissolved or diluted by the dispensing system, whereby the pumping system passes a fluid at specific parameters through the capsule. The parameters are based on the product to be dissolved/diluted, and the parameters include the volume of the fluid flowing through the capsule, the pressure of the fluid going into the capsule, the type of fluid going through the capsule, and/or the temperature of fluid going into the capsule. In a non-limiting example, the fluid is a liquid such as water. In one embodiment, the dispensing system uses the heating system 108 if the parameters indicate that the fluid should be heated before passing through the capsule. In one embodiment, the heating system is a heating coil or other heating element that is, for example wrapped around the inlet tube leading the fluid into the capsule. The dispensing system further includes an outlet to dispense the dissolved/diluted and/or heated product as the final product. In one embodiment, the final product provides specific health and/or wellness benefits. In an embodiment, the final product is a beverage or medicine.

In the example of FIG. 1, the capsule holder 102 is configured to accept different types of capsules, where each capsule may contain a different product. The capsule holder is, for example, a capsule holder that is configured such that the shape of the capsule fits inside the holder to hold the capsule in place. In one embodiment, each different product provides specific health and/or wellness benefits, such as, in a non-limiting example: relieving aches, boosting memory, facilitating sleep, improving cognitive function, improving brain activity, detoxification, cleansing, boosting the immune system, etc. Each different product may require particular dispensing parameters, including, for example, the volume of the fluid, the pressure of the fluid, the type of fluid, the temperature of the fluid, or any other parameters relating to the dissolution of the product. In a non-limiting example, the temperature of the fluid can range from ambient to 90° C. (194° F.), whereby the temperature may be assigned to provide an optimal dissolvability, taste, bio efficacy, and/or bioavailability, for each different product. However, other temperature ranges can be used, from below ambient temperature (chilled) to above 90° C. In a non-limiting example, the volume of fluid going though the capsule is adjusted and can range, for example, from 60 mL to 355 mL (approx. 2 US fl. oz. to 12 US fl. oz.), for typical beverages. However, other volume ranges can also be used for given applications. Dispensing of the final product may require only low fluid pressure, thus circumventing the need for unique pressurized systems. In one embodiment, the pumping system 106 is a pump that pumps fluid (for example from a tank attached to the dispensing machine) to the capsule holder (and through the heating system, if present). In one embodiment, the pumping system includes one or more valves and may be attached to a pressurized fluid outlet, whereby the fluid outlet is internal (for example pressurized cylinder) or external (for example an indoor water tap) to the dispensing system. In this embodiment, the valve is configured to control the pressure and/or volume of the fluid going through the capsule.

In the example of FIG. 1, in operation, the capsule holder 102 determines the parameters to use for a capsule 206 inserted into the capsule holder 102. In one embodiment, the capsule holder determines the parameters when the capsule is inserted into the capsule holder, whereby the determination is based on one or more encoding means of the capsule. The encoding means on the capsule includes, for example, one or more of the following: engaging tabs, mechanical groves, magnetic card, unique label, etc. The encoding means are detected by an encoding recognition system of the capsule holder when the capsule is placed in the capsule holder. The detected encoding means are then converted into the appropriate parameters by the processing device 104. The processing device may be a processor, an electronic circuit, or any other type of electronic and/or mechanical means for controlling the heating system and pumping system. Each encoding means may represent a specific parameter or the encoding means may be used collectively to indentify the type of product contained in the capsule. In one example embodiment, the detected encoding means are be compared to a database (e.g., stored in the machine or online) where they are matched to the corresponding parameters, thereby giving the values for the temperature, volume, pressure, and/or type of liquid to be used. In another embodiment, the encoding means of the capsule may automatically change dispensing parameters (such as by mechanical or electronic means), thereby eliminating the need for storage of the parameters and comparison with a database. Once the capsule holder detects the encoding means, the processing device controls the pumping system 106 and/or the heating system 108 to provide the correct parameters relating to the fluid to pass through the capsule in order to produce an optimized final product.

The final product may be a cold, warm, or hot final product (e.g. beverage, medicine, etc.). In a non-limiting example, the final product provides specific health benefits and/or medical benefits (e.g., reducing fatigue, reducing the risk of constipation, address deficiencies of amino acids, boosting protein intake, providing nutritional supplements, improving the flexibility of the joints, improving mobility, improving the cognitive brain activity, improving physiological well-being, etc.). In a non-limiting example, the final product is a soda, juice, or other cold drink. In another non-limiting example, the final product is a hot drink, such as coffee, tea, or hot chocolate. In a non-limiting example, the final product is a sports drink, nutritional drink, or fluid meal replacement. The product contained in the capsule 206, from which the final product is derived, may include, without limitation, antioxidants, guarana, acai, taurine, ginseng, maltodextrin, inositol, ginkgo biloba, yerba mate, micronutrients, thiamin, riboflavin, niacin, pyridoxine, pantothenate, biotin, cobalamin, iron, magnesium, glucosamine, chondroitin, fatty acids, amino-acids, proteins, omega-3, vitamins, minerals, coffee, green tea, natural herb extracts, and/or other ingredients.

Figure 2:
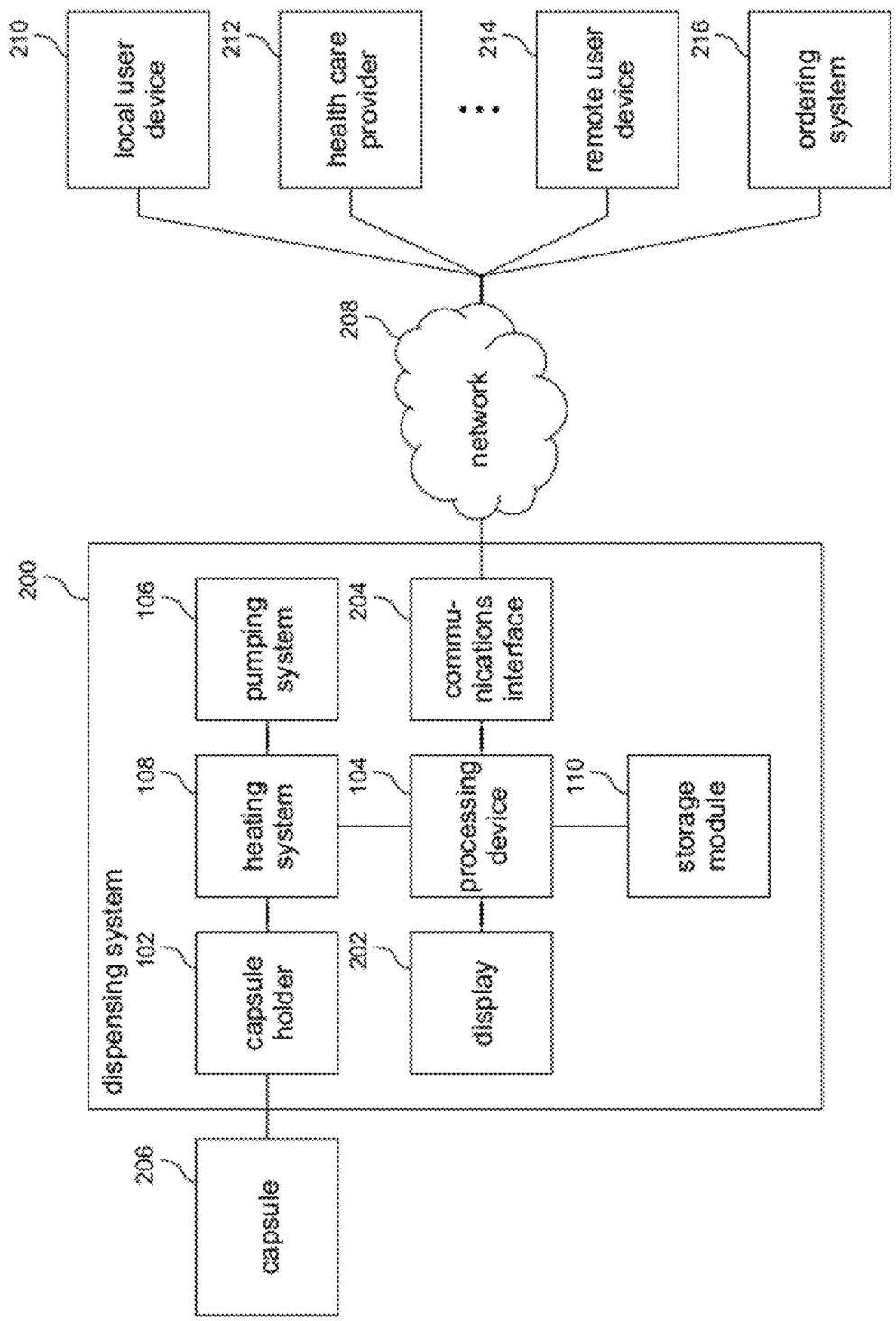
FIG. 2 depicts a schematic block diagram of a dispensing system in a networked environment in accordance with an embodiment of the invention.

FIG. 2 depicts a schematic block diagram of a dispensing system 200 in a networked environment in accordance with an embodiment of the invention. In the example of FIG. 2, the dispensing system includes the capsule holder 102, the processing device 104, the pumping system 106, the heating system 108, a display 202, a communications interface 204, and a storage module 106. The dispensing system is configured to accept a capsule 206. In one embodiment, the capsule has a distinct and unique functional design to allow full product dissolution and utilization and long product shelf life at ambient conditions. The capsule can be made from biodegradable environmentally friendly materials as well as other materials such as PET. In a non-limiting example, the capsule holds approximately 25 grams of powdered products depending on their bulk density or approximately 50 cm$^3$ of concentrated liquid. The capsule is designed to fit into the capsule holder and may be aligned in a given position.

In the example of FIG. 2, the dispensing system is further connected to a local user device 210, a health care provider 212, a remote user device 214, and/or an ordering system 216. The display of the dispensing system may provide a graphical user interface to a user of the dispensing system and the display may further provide means for the user of the dispensing system to input information (e.g., age, weight, gender). In one embodiment, the display is a touch screen display and further allows the user of the dispensing system to interact with the local user device, the health care provider, the remote user device, and/or the ordering system via the communications interface and the network. In one embodiment, the health care provider, for example if previously agreed with the user of the dispensing system, may also give recommendations about usage of the dispensing system (e.g., the optimal type of capsule to be used, time of day to be used, etc.) to the user of the dispensing system, and the recommendations can be presented on the display of the dispensing system.

The communications interface 204 provides a network interface for the dispensing system 200 to access the network 208 (e.g., a serial connection, a local network, the Internet, an intranet, and/or a private enterprise network). In one embodiment, the communications interface is configured to connect to a local or remote personal computer, tablet, smartphone, or server. The communications interface may also provide access to wireless service provider networks (e.g., that offer 2G, 3G, 4G and/or WiMax access) and Internet Service Providers (ISPs, e.g., that offer dial-up, DSL, cable modem, and/or WiFi access). The communications interface may support various RF communications protocols, including without limitation, Bluetooth, protocols defined by the Infrared Data Association (IrDA), Global System for Mobile communications (GSM), Universal Mobile Telecommunications System (UMTS), Code Division Multiple Access (CDMA), 4G Long Term Evolution (LTE), IEEE 802.11, and IEEE 802.16. Although some wireless communications protocols are identified herein, it should be understood that the present disclosure is not limited to the cited wireless communications protocols.

In one embodiment, the dispensing system 200 is configured to monitor the usage pattern of the user of the dispensing system, as agreed and requested by the user, in order to ensure that the correct products are taken a proper amount of times at adequate intervals. The dispensing system may also allow the user of the dispensing system to indentify him/herself to be able to uniquely monitor the user. This is especially useful if the dispensing system is used by more than one user. In one embodiment, the dispensing system keeps a record of the products used and alerts the user of the dispensing system when supplies of a given product type become low. The record may, for example, be stored in the storage module 110 or online. The dispensing system may further be programmed to automatically order new products, for example when they become low, whereby the automatic ordering may be done by the communications interface 204 connecting to the ordering system 216. In one embodiment, the dispensing system is configured to allow the user of the dispensing system to order new capsules via, for example, a touchscreen.

In one embodiment, a given product type may be subjected to different dispensing parameters to achieve a final product having different desired characteristics depending on a user's need. For example, a change in one or more parameters from the standard parameters may lead to some portions of the product being preferentially dissolved or components of the product to combine in a specific way based on the parameters used. In a non-limiting example, this change from the standard parameters optimizes bioavailability and efficacy of certain components of the product, leading to a final product that is tailored to the user's need. The user's need can be based on user information including, for example, a user's personal information (e.g., weight, age, gender), a user's health parameters (e.g., preexisting conditions, current health conditions), the time of day, or other parameters. The standard parameters are defined as the parameters given by the encoding means of the capsule, as described above with reference to FIG. 1. The change in the standard parameters may, for example, include decreasing or increasing the temperature, pressure, or volume by a certain amount from the standard temperature, pressure, or volume.

In one embodiment, at least part of the user's health parameters may be obtained from a device measuring the user's current health conditions (e.g. wrist watch configured to measure a user's heart rate, blood glucose level, or other health related parameters). The user's current health conditions may be transmitted to the communications interface 204 through a wired communication technology or a wireless communication technology, such as Bluetooth, Wi-Fi, infrared, or 3G. The user's current health conditions, alone or in combination with other user information, can be used by the processing device 104 to adjust the dispensing parameters. For example, a user with a high blood glucose level may need a different amount of a certain dissolved component of a product from a capsule to achieve the same desired effect as a user with a normal blood glucose level.

In one embodiment, at least parts of the user information (new information or updated information) are received at or requested by the dispensing system 200 from the health care provider 216 via the network 208, and the user information can be used to adjust the dispensing parameters for one or more product types based on the user information, as described above. In one embodiment, the user previously agreed to receive the user information from the health care provider. The user information may be based on regular check-ups of the user at the health care provider's facility. Alternatively or additionally, the user may change the user information manually via an interface (e.g., display 202) on the dispensing system.

Figure 3:
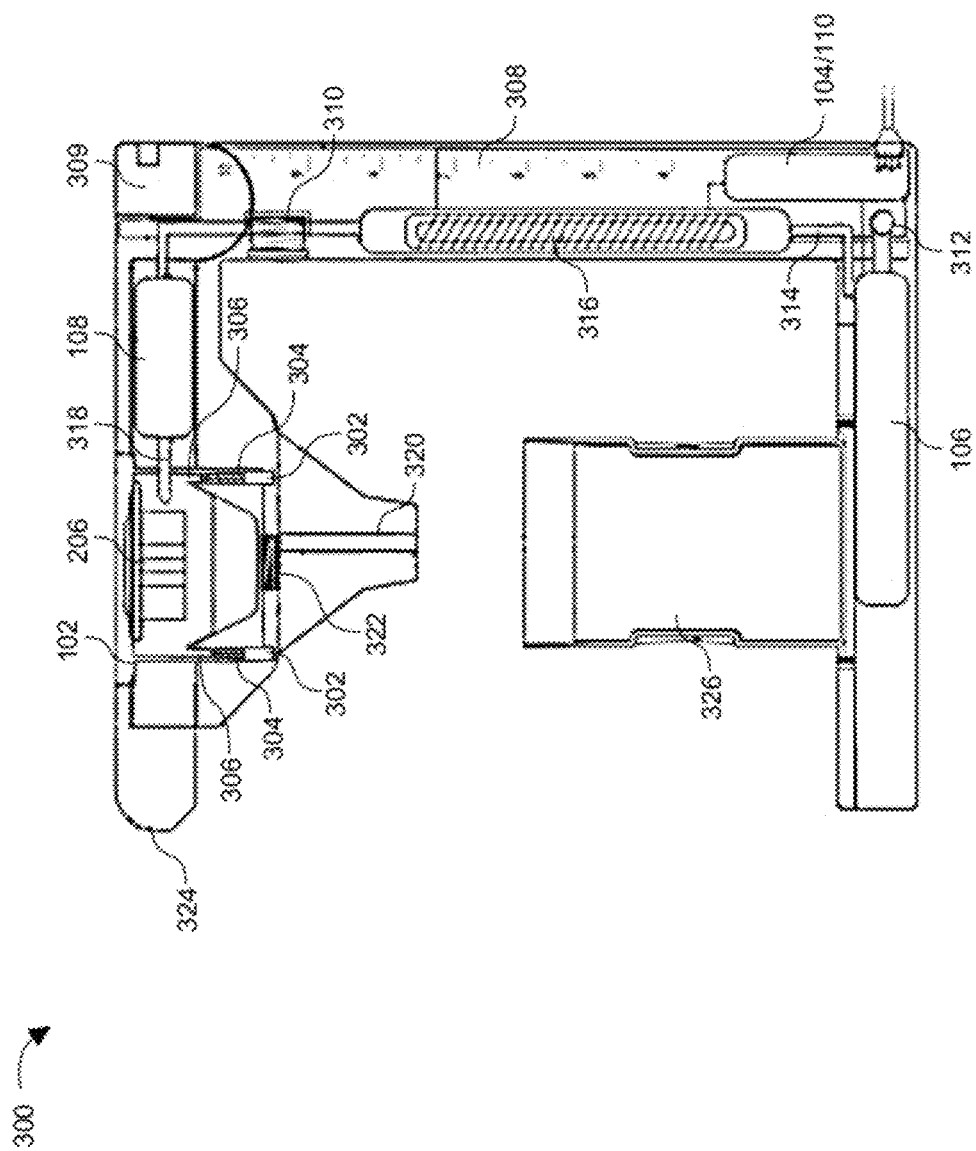
FIG. 3 depicts a schematic diagram of a dispensing system in accordance with an embodiment of the invention.

FIG. 3 depicts a schematic diagram of a dispensing system 300 in accordance with an embodiment of the invention. In the example of FIG. 3, the dispensing system includes the capsule holder 102, the processing device 106, the storage module 110, transducers 302, trigger springs 304, a fluid tank 308, a cap 309, a tank spring release mechanism 310, a pumping system feed 311, the pumping system 106, a tube 314, a magnetic fluid treatment system 316, an injection system 318, an outlet 320, a capsule spring release mechanism 322, and a top part 324. A capsule 206 is inserted in the dispensing system, and the capsule includes engaging tabs 306. Furthermore, a receiving cup is shown under the outlet of the dispensing system, the receiving cup being used to collect the final product flowing from the outlet.

In operation, when the capsule 206 is inserted into the capsule holder 102, the transducers 302 and the trigger springs 304 interact with the capsule engaging tabs 306 of the capsule 206, and the transducers determine the parameters to be used based on the configuration of the capsule engaging tabs. In one embodiment, the length of the capsule engaging tabs determines the parameters to be used and the transducer is deformed lengthwise by the capsule engaging tabs. In the example of FIG. 3, the trigger springs surround at least parts of the transducers, and upon removing the capsule, the transducers return to their original shape/length as the trigger springs push part of the transducers upwards. In one embodiment, the transducers only determine the parameters when the top part 324 (e.g., a lid or handle) of the dispensing system is closed and pushes the capsule into position. The transducers are operatively coupled to the processing device 104, and the processing device controls the pumping system 106, the heating system 108, and/or the magnetic water treatment system 316 based on the parameters.

In the example of FIG. 3, the fluid tank 308 is a detachable tank positioned at the rear of the dispensing system 300 and is held in place by the tank spring release mechanism 310. The fluid tank can be released from the rest of the dispensing system by a pushing mechanism through the tank spring release mechanism. The fluid tank may be equipped with filter (allowing refill of the tank and filtering the fluid). The fluid tank is configured to be filled with a fluid such as water by removing the cap 309, and is connected to the pumping system 106 through the pumping system feed 312. The pumping system is further connected to the injection system 318 through the tube 314, which passes by the magnetic fluid treatment system 316 and the heating system 108.

In one embodiment, the magnetic fluid treatment system 316 includes one or more permanent magnets and/or an AC pulsed field. The magnetic fluid treatment system can be used to prevent mineral salts incrustation, and therefore to prevent scaling on the sidewalls of the tube 314, the injection system 318 or other components of the dispensing system 300. The magnetic fluid treatment system can prevent build up of deposits on the wall of the dispenser tubes and reduces precipitation of calcium carbonate scale from hard water. Furthermore, using the magnetic fluid treatment system reduces biofilm formation and decreases microorganisms sticking on the dispensing tube, by affecting ionic layer surrounding the colloidal particles and their zeta potential. The reduction of calcium carbonate precipitation due to the presence of the magnetic fluid treatment results in reduced energy required for heating, and improved overall water taste and perceived water quality. The magnetic fluid treatment may also be used to influence the dissolution characteristics for a given liquid temperature, volume, pressure, and/or type of liquid.

In operation, when a capsule is present, such as the capsule 206, the fluid from the fluid tank 308 is pumped into the capsule through the injection system 318. In the example of FIG. 3, the injection system is a horizontally engaging injection probe, but other configuration, such as vertical or angled injection probes are also possible. The fluid passes by the magnetic fluid treatment system 316 and the heating system 108 before being injected into the capsule. In one embodiment, the presence of the capsule is determined by a sensor (not shown) and the flow of fluid is only started when the sensor detects that the capsule is correctly inserted. The capsule, while pushed down by the top part of the dispensing system, activates the sensor, which activates the pumping system and the dispensing of the fluid. The sensor may, for example, be at the bottom of the capsule holder or may be arranged to detect closure of the top part. In another embodiment, the transducers are used to determine the presence and correct insertion of the capsule. In one embodiment, the fluid is inserted into the capsule by the injection system inserting a probe into the capsule by piercing a wall of the capsule. The fluid then passes through the capsule, thereby dissolving/diluting the product contained in the capsule. The final product leaves the capsule and passes through the outlet 320 (e.g., a pipe) before the final product can be collected by, for example, the receiving cup 326. When the dispensing is completed the capsule can be released by lifting the top part 324, whereby the capsule spring release mechanism 322 pushes the capsule up allowing easy removal of the capsule.

FIGS. 4A and 4B depict schematic diagrams of a design of a dispensing system 400 in accordance with an embodiment of the invention. In the example of FIG. 4A, the dispensing system is shown with the top part 324 of the dispensing system closed. FIG. 4B shows the top part open, whereby a capsule such as the capsule 206 can be inserted into the dispensing system. Closing the top part may push the capsule further down and may trigger a sensor and allow the pumping of the fluid to start. The fluid may be pumped automatically through the capsule once the top part is closed or the fluid may be pumped when the top part is closed and a button is pushed to initiate the flow of the fluid. Furthermore, closing the top part and pushing the capsule down may pierce the bottom of the capsule such that the fluid can flow through the capsule. Alternatively, the bottom of the capsule only opens once enough pressure has been established from the fluid flowing into the capsule, as will be described below with reference to FIGS. 7 and 8.

Figure 5C:
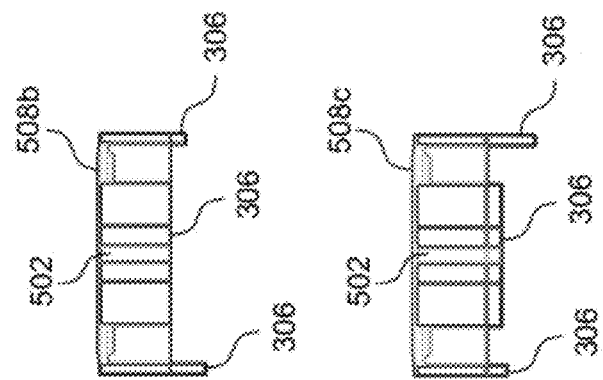
FIGS. 5A-5C depict schematic diagrams of a capsule for use in a dispensing system in accordance with an embodiment of the invention.
Figure 5B:
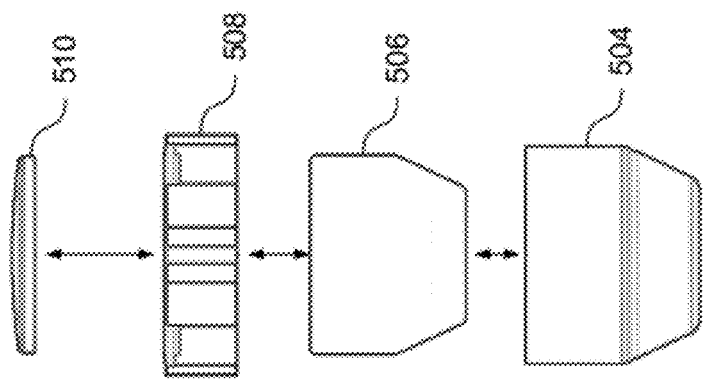
Figure 5A:
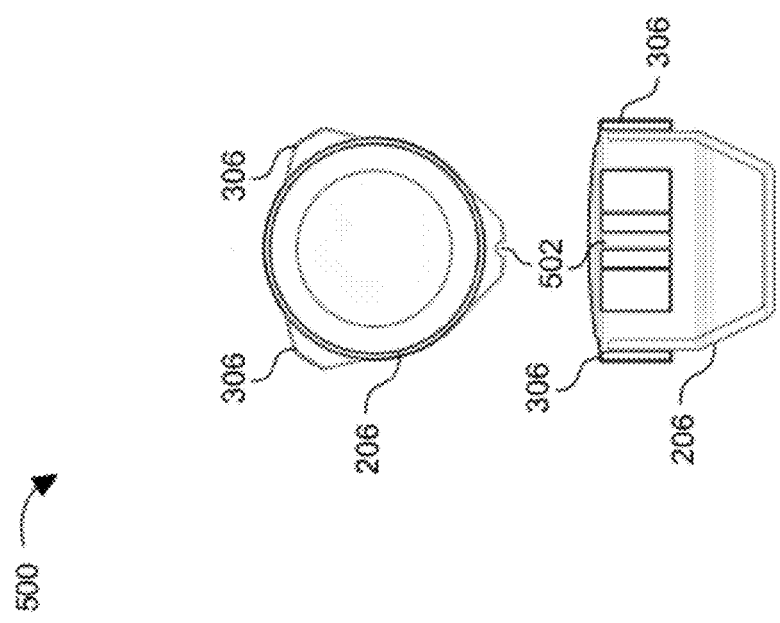

FIGS. 5A-5C depict schematic diagrams of a capsule 206 for use in a dispensing system in accordance with an embodiment of the invention. In the example of FIG. 5A, the capsule includes the capsule engaging tabs 306 and a centering tab 502. Although three capsule engaging tabs are shown, the embodiment is not limited to three, and any number of capsule engaging tabs may be present or used for determining the optimal parameters for the product contained in the capsule. For example, in one embodiment, only two of the tabs are used as engaging tabs to encode the parameters, which may for example be the volume and the temperature. In another embodiment, one capsule engaging tab is used, whereby the length of the tab identifies the type of product in the capsule, and the dispensing system determines the optimal parameters (e.g., volume, temperature, and/or pressure) to use based on this identification. In one embodiment, each capsule engaging tab encodes a separate parameter. In another embodiment, the combination of the length of the capsule engaging tabs determines the parameters. The capsule engaging tabs may alternatively have different shapes and sizes.

The top part of FIG. 5A shows a top view of the capsule 206. The bottom part of FIG. 5A shows a side view of the capsule 206. The centering tab 502 ensures that the capsule is correctly inserted into the dispensing system, and that each capsule engaging tab 306 interacts correctly with the dispensing system. In one embodiment, the capsule holder of the dispensing system includes a pin and the centering tab includes a grove, whereby the capsule can only be inserted into the dispensing system if the grove of the capsule aligns with the pin of the capsule holder. The centering tab may also be used as a capsule engaging tab for encoding the parameters, as shown in FIG. 5C.

FIG. 5B shows an exploded view of the capsule 206. In the example of FIG. 5B, the capsule includes a housing 504, a powder or liquid 506, a cap 508, and a top seal 510. In one embodiment, the top seal is sealed to the cap. In a non-limiting example, the top seal is sonically sealed onto the housing, while other methods may also be used such as laser welding. In one embodiment, the top seal and the cap are molded in one piece. The capsule is filled with powders representing the various recipes of varying ingredients. In one embodiment, the powder or liquid is filled directly into the housing of the capsule prior to sealing. In another embodiment, the powder is first filled into small filter bags, similar to 'flo-thru tea bags', and then placed into the housing of the capsule prior to placing and sealing the cap. In an embodiment, a filter is placed at the bottom of the capsule. The filter and/or the filter bag may be used to ensure full dissolution and preventing the dispensing of undissolved particles. The pore size of the filter and/or the tea bag typically ranges from 25 to 100 μm and the optimal range is selected based on the product's powder size.

FIG. 5C shows embodiments of tabs 508b and 508c with capsule engaging tabs of different length, where the length of the capsule engaging tabs provides the mechanism to control fluid volume, temperature, pressure, and/or other parameters, as well as alignment and proper positioning in the capsule holder of the dispensing system.

Figure 6:
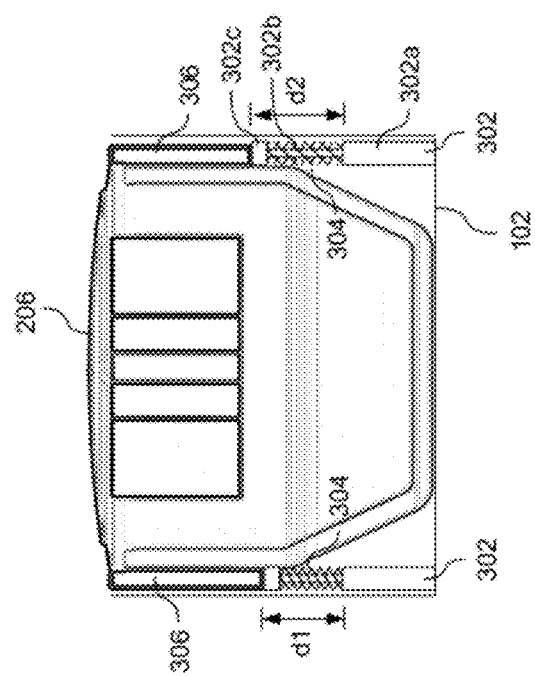
FIG. 6 depicts a schematic diagram of a capsule holder of a dispensing system in accordance with an embodiment of the invention.

FIG. 6 depicts a schematic diagram of a capsule holder 102 of a dispensing system in accordance with an embodiment of the invention. In the example of FIG. 6, the capsule holder includes transducers 302 and trigger springs 304. In one embodiment, the transducers are linear variable differential transformers (LVDT) for measuring linear displacement. In an embodiment, the transducers include a fixed part (e.g., lower part 302a) and a moving part (e.g., part 302b surrounded by trigger springs and part 302c above trigger springs). The transducers are compressed by the capsule engaging tabs 306 of the capsule 206. In the example of FIG. 6, the left capsule engaging tab is longer than the right capsule engaging tab. As a result the distance d1 is smaller than the distance d2, that is, the left transducer is compressed more than the right transducer. The length d1 may, for example represent the volume of fluid to flow through the capsule, whereas the length d2 may represent the temperature of the fluid. When the capsule is removed from the capsule holder, the part 302b and the top part 302c of the transducers move back to their original position as the spring exerts pressure on the top part 302c, thereby moving the top part 302c and the part 302b upwards. Another capsule, containing another product, may have capsule engaging tabs of different lengths to the capsule engaging tabs shown in FIG. 6, and may therefore encode different parameters. The lengths d1 and d2 are merely illustrative, and it may not be the displacement that is used to determine the parameters. In one embodiment, the displacement of the transducers due to the capsule engaging tabs induces a voltage that is measured to determine the parameters. Although more than one transducer is shown, the capsule holder may also include only one transducer, whereby the transducer determines one or more dispensing parameters of the dispensing system, as described above with reference to FIG. 1. Alternatively or in conjunction with the transducers, other encoding recognition systems may be used. For example, the capsule may have one or more recesses and flat surfaces at the bottom of the capsule, where the recesses and flat surfaces engage with an array of push switches (or other transducers) of the capsule holder. In this example, a flat surface of the capsule bottom would press the push switches and the recesses would leave the push switches in their original state, and the state of the push switches can be used to determine the parameters. Other encoding recognition systems may include mechanical, optical, and/or electronic encoding means.

Figure 7:
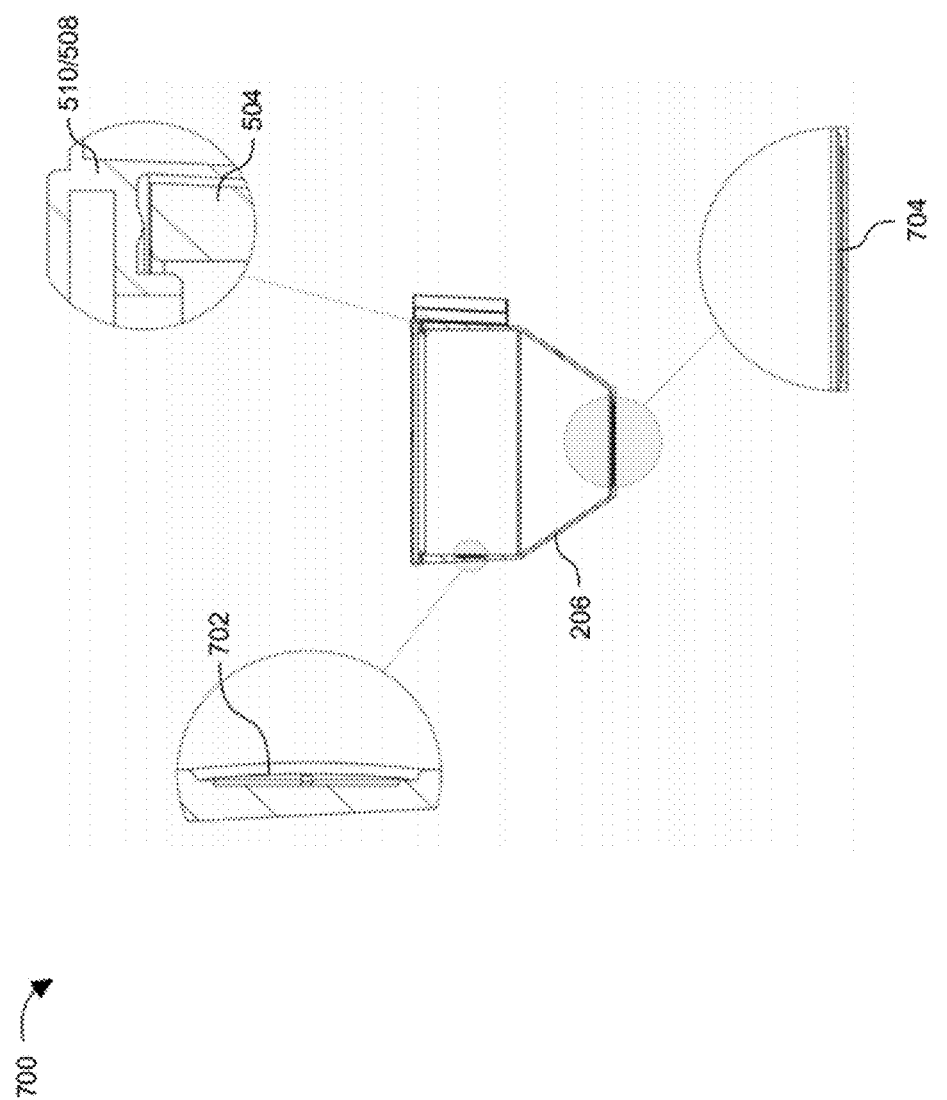
FIG. 7 depicts a schematic diagram of membranes of a capsule for use in a dispensing system in accordance with an embodiment of the invention.

FIG. 7 depicts a schematic diagram of membranes of a capsule 206 for use in a dispensing system in accordance with an embodiment of the invention. In one embodiment, the capsule is a container that is detachable from the dispensing system. The capsule is typically sealed and the seal may be broken when the capsule is placed in the capsule holder or when the fluid is flowing into the capsule. In the example of FIG. 7, the capsule includes a thin sidewall membrane 702 and a thin outlet membrane 704. The thin sidewall membrane allows for easy piercing and sealing of the probe of the fluid injection system. In the example of FIG. 7, the thin outlet membrane is situated at the bottom of the capsule, and the thin outlet membrane, when open, allows the dissolved/diluted product to exit the capsule. In one embodiment, the thin outlet membrane opens by the action of piercing nodules, for example when the top part of the dispensing system presses the bottom of the capsule against the piercing nodules. In another embodiment, the thin outlet membrane opens only when sufficient pressure has built up inside the capsule from the fluid flowing into the capsule. The thickness, material, or other parameters of the thin outlet membrane may be chosen to provide optimal time/pressure for dissolution before the thin outlet membrane opens, and the thickness, material, or other parameters can depend on the type of product in the capsule. FIG. 7 further shows the housing 504, the top seal 510 and/or the cap 508. In one embodiment, the top seal and/or the cap is sonic welded to the housing for the capsule to be hermetically sealed.

In one embodiment, the capsule 206 may contain different compartments, each compartment, for example, containing a different product. Each compartment may be pierced by a separate fluid injection system and each product may require different dispensing parameters. In one embodiment, the different products from the different compartments are each dissolved/diluted and are combined to form a final product.

Figure 8:
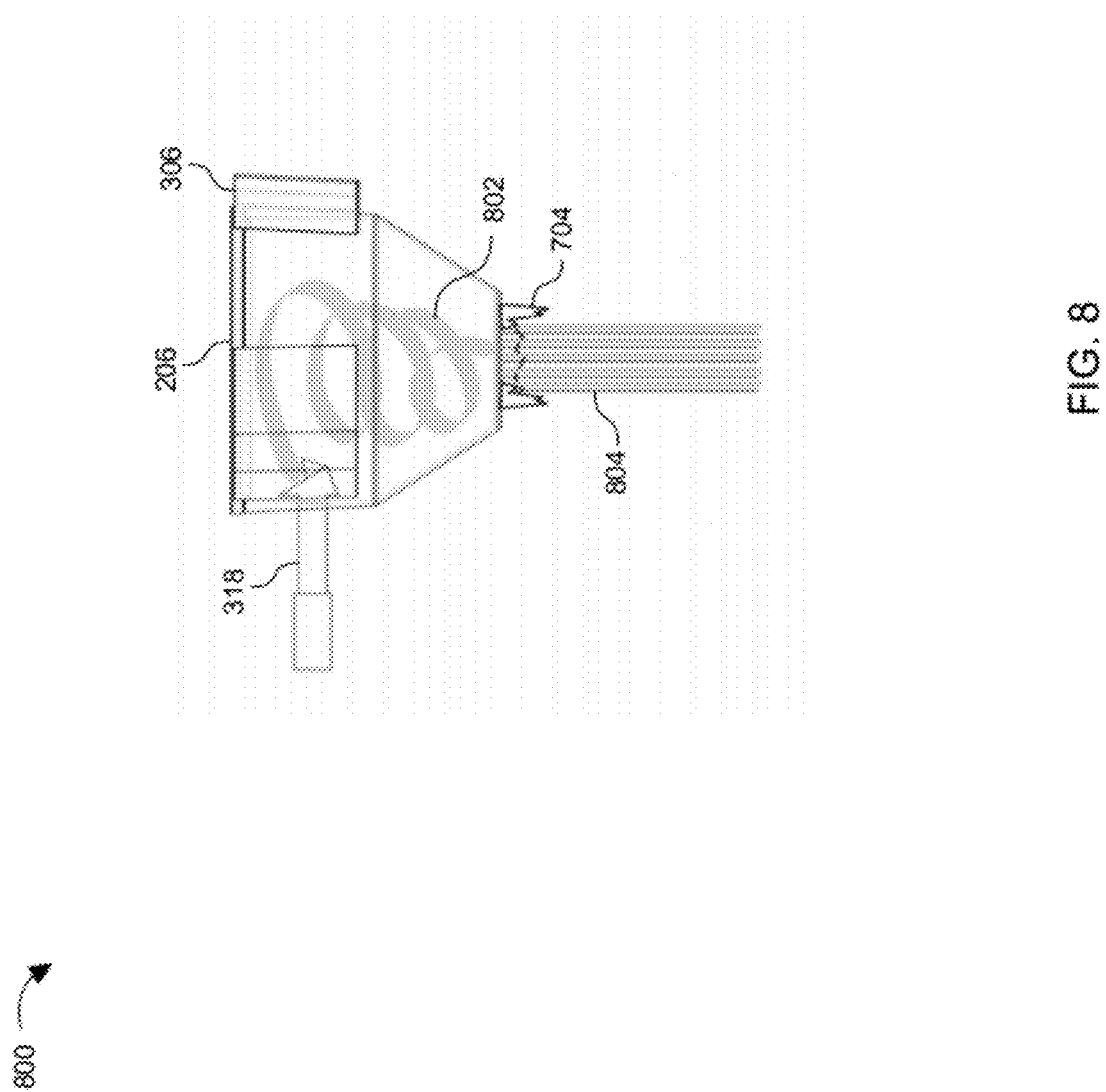
FIG. 8 depicts a schematic diagram of a fluid injection system for injecting fluid into a capsule in accordance with an embodiment of the invention.

FIG. 8 depicts a schematic diagram of a fluid injection system 318 for injecting a fluid into a capsule 206 in accordance with an embodiment of the invention. In the example of FIG. 8, the fluid injection system includes a horizontal fluid injector. In another embodiment, the fluid injector could pierce the capsule from the top or bottom. Additionally, more than one fluid injector may also be used. The horizontal fluid injector can be positioned off-center, thus allowing for an improved circular flow of the fluid 802 inside the capsule. A swirling action of the liquid as produced by the circular flow helps mixing the powder or liquid and dissolving the powder or liquid into the final product. The height of the horizontal fluid injector with respect to the bottom of the capsule may be defined by optimal operational conditions (e.g., dissolution, avoiding piercing of the filter bag if the filter bag is used, piercing force, etc.). In one embodiment, a weak spot is created at the bottom of the capsule or a thin membrane 704 is inserted over a hole at the bottom of the capsule, whereby the weak spot or thin membrane burst under the pressure built up through the fluid injected into the capsule, thus allowing the dissolved/diluted product 804 to exit the capsule. The fluid injection system injects the fluid into the capsule using the parameters given by the capsule engaging tabs 306.

Figure 9:
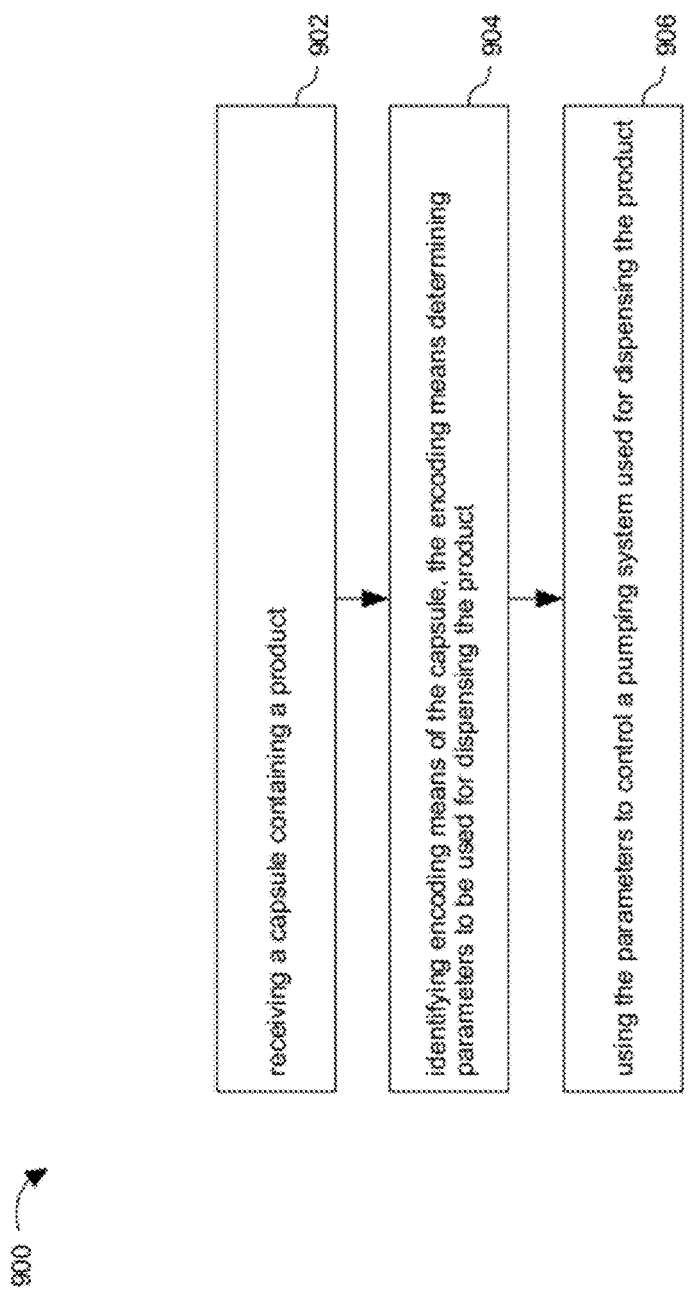
FIG. 9 depicts a flow diagram of a method for identifying parameters for use with a capsule received at a dispensing system in accordance with an embodiment of the invention.

FIG. 9 depicts a flow diagram of a method for identifying parameters for use with a capsule received at a dispensing system in accordance with an embodiment of the invention. At block 902, a capsule containing a product is received. Next, at block 904, encoding means of the capsule are identified, the encoding means determining parameters to be used for dispensing the product. Next, at block 906, the parameters are used to control a pumping system to dispense the product.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital versatile disk (DVD).

In an embodiment, the functionality of at least some of the components depicted in FIGS. 1 through 9 is performed by a computer that executes computer readable instructions. FIG. 10 depicts a computer 1000 that includes a processor 1002, memory 1004, and a communications interface 1006. For example, parts of the dispensing system 100 to 400 may be implemented in computer hardware and/or software. The processor may include a multifunction processor and/or an application-specific processor. Examples of processors include the PowerPC™ family of processors by IBM and the x86 family of processors by Intel. The memory within the computer may include, for example, storage medium such as read only memory (ROM), flash memory, RAM, and a large capacity permanent storage device such as a hard disk drive. The communications interface enables communications with other computers via, for example, the Internet Protocol (IP). The computer executes computer readable instructions stored in the storage medium to implement various tasks as described above.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system for dispensing a beverage, the system comprising:
　a pumping system; and
　a capsule holder operatively coupled to the pumping system, the capsule holder configured to receive a capsule containing an ingredient, the capsule holder further configured to receive a fluid through the capsule from the pumping system, said capsule holder including one or more transducers configured to interact with one or more tabs of the capsule, wherein the transducers determine parameters based on the one or more tabs;
　the parameters are used for dispensing of the fluid through the capsule holder and through the capsule to produce the beverage by dissolving the ingredient using said parameters, wherein said parameters control the pumping system; and
　wherein the displacement of said transducers be said tabs determines the parameters.

2. The system of claim 1, wherein the parameters include at least one of: a temperature of the fluid inside the capsule holder, a pressure of the fluid inside the capsule holder, a volume of the fluid passing through the capsule holder to produce the beverage.

3. The system of claim 1, wherein the capsule holder further includes a groove for aligning the capsule, wherein each of the one or more transducers is configured to be aligned with a specific one of the one or more tabs of the capsule.

4. The system of claim 1, wherein the beverage has medicinal properties.

5. The system of claim 1 further comprising a heater, wherein the parameters include at least a temperature of the fluid inside the capsule holder, further wherein the heater is configured to produce said temperature of the fluid inside the capsule holder, said temperature being controlled by at least one of said one or more transducers.

6. The system of claim 1, wherein the parameters are further adjusted by user information, wherein said user information includes at least one of: age of a target person for said beverage, weight of the target person.

7. The system of claim 1, further comprising a network interface configured for receiving health related information from a monitoring device, the health related information further adjusting the parameters.

8. The system of claim 6 further comprising an input device for receiving said user information, wherein the input device is at least one of: a touch screen, a keyboard, a network interface.

9. A capsule for use in the system of claim 1, said capsule comprising:
a recipient including an ingredient; and
one or more tabs, wherein the length of the tabs is configured to encode at least one of one or more parameters used to produce a beverage from the ingredient.

10. The capsule of claim 9, wherein the parameters are at least one of: a temperature of the fluid inside the capsule holder, a pressure of the fluid inside the capsule holder, a volume of the fluid passing through the capsule holder to produce the beverage.

11. The capsule of claim 10, wherein the fluid passes through the capsule at the parameters as encoded by the length of the tabs to produce the beverage.

12. The system of claim 7, wherein the network interface is configured to receive the health related information through a wireless connection from a wrist watch adapted to measure said health related information.

13. The system of claim 1, wherein the one or more transducers are configured to measure linear displacement.

14. The system of claim 13, wherein the one or more transducers are linear variable differential transformers.

15. The system of claim 1 further comprising:
a line adapted to feed water from the pumping system to the capsule holder;
a water treatment system disposed along the line between the pumping system and the capsule holder, the water treatment system configured to generate a magnetic field in the line;
wherein the magnetic field results in at least one of: preventing build up of deposits on a wall of the line, preventing biofilm formation on the wall of the line, reducing precipitation of calcium carbonate scale.

16. The system of claim 1 further comprising a fluid injection system configured to inject a fluid into the capsule, the fluid injection system including a needle adapted to pierce the capsule, wherein the needle is positioned off-centre with respect to a horizontal plane of the capsule and the needle produces a circular swirling flow of the fluid inside the capsule when the capsule receives the fluid from the pumping system through the fluid injection system.

* * * * *